United States Patent
Newell et al.

(10) Patent No.: US 10,127,374 B2
(45) Date of Patent: Nov. 13, 2018

(54) METHODS FOR CONTROLLING THE USE OF INTELLECTUAL PROPERTY IN INDIVIDUAL INTEGRATED CIRCUIT DEVICES

(71) Applicant: Microsemi SoC Corporation, San Jose, CA (US)

(72) Inventors: G. Richard Newell, Tracy, CA (US); Paul Ekas, Redwood City, CA (US)

(73) Assignee: MICROSEMI SOC CORPORATION, San Jose, CA (US)

( * ) Notice: Subject to any disclaimer, the term of this patent is extended or adjusted under 35 U.S.C. 154(b) by 0 days.

(21) Appl. No.: 14/632,860

(22) Filed: Feb. 26, 2015

(65) Prior Publication Data
US 2015/0242615 A1 Aug. 27, 2015

Related U.S. Application Data

(60) Provisional application No. 61/945,387, filed on Feb. 27, 2014.

(51) Int. Cl.
*G06F 7/04* (2006.01)
*G06F 17/30* (2006.01)
(Continued)

(52) U.S. Cl.
CPC .............. *G06F 21/44* (2013.01); *G06F 21/51* (2013.01); *G06F 21/76* (2013.01); *G06F 2221/2129* (2013.01); *G06F 2221/2149* (2013.01)

(58) Field of Classification Search
CPC ...................................................... G06F 21/76
See application file for complete search history.

(56) References Cited

U.S. PATENT DOCUMENTS 6,446,242 B1* 9/2002 Lien ..................... G06F 17/5054
326/38
6,904,527 B1* 6/2005 Parlour ................... G06F 21/76
713/100

(Continued)

FOREIGN PATENT DOCUMENTS

GB 2499985 A 9/2013
WO 2004006071 1/2004

OTHER PUBLICATIONS

Altera Corporation, "OpenCore Plus Evaluation of Megafunctions," Application Note 320, Version 1.6, Nov. 2007, 10 pages.
(Continued)

*Primary Examiner* — Lynn D Feild
*Assistant Examiner* — Vadim Savenkov
(74) *Attorney, Agent, or Firm* — Glass & Associates; Kenneth D'Alessandro; Kenneth Glass (57) ABSTRACT

A method for controlling the use of intellectual property (IP) in an individual integrated circuit includes loading data including the IP into the individual integrated circuit, loading an IP license certificate into the individual integrated circuit, the certificate including identification of the IP authorized for the individual integrated circuit, determining inside the individual integrated circuit whether the IP is authorized for the individual integrated circuit, enabling operation of the individual integrated circuit if the IP circuit is authorized for use in the individual integrated circuit, and imposing a penalty on operation of the individual integrated circuit if the IP is not authorized for use in the individual integrated circuit.

12 Claims, 6 Drawing Sheets

(51) Int. Cl.
  *H04N 7/16* (2011.01)
  *G06F 21/44* (2013.01)
  *G06F 21/51* (2013.01)
  *G06F 21/76* (2013.01)

(56) References Cited

U.S. PATENT DOCUMENTS

| | | | | |
|---|---|---|---|---|
| 6,978,374 B1* | 12/2005 | Hansen | ............... | G06F 21/71 |
| | | | | 713/183 |
| 7,716,497 B1* | 5/2010 | Trimberger | ............ | G06F 21/62 |
| | | | | 365/186 |
| 7,788,502 B1* | 8/2010 | Donlin | ............... | G06F 21/76 |
| | | | | 380/255 |
| 8,427,193 B1* | 4/2013 | Trimberger | ......... | H03K 19/003 |
| | | | | 326/38 |
| 8,547,136 B1* | 10/2013 | Guilloteau | ............ | G06F 21/105 |
| | | | | 326/38 |
| 8,729,922 B2* | 5/2014 | McElvain | ............ | G06F 17/5045 |
| | | | | 326/8 |
| 8,949,586 B2 | 2/2015 | Grieco et al. | | |
| 9,009,492 B2 | 4/2015 | Belenky et al. | | |
| 2002/0150252 A1* | 10/2002 | Wong | ............... | G06F 21/76 |
| | | | | 380/277 |
| 2002/0199110 A1* | 12/2002 | Kean | ............... | G06F 17/5054 |
| | | | | 713/189 |
| 2003/0159047 A1 | 8/2003 | Smeets et al. | | |
| 2003/0172268 A1 | 9/2003 | Walmsley et al. | | |
| 2004/0177050 A1 | 9/2004 | Athens et al. | | |
| 2004/0190868 A1 | 9/2004 | Nakano et al. | | |
| 2004/0255152 A1* | 12/2004 | Kanamori | ............ | G06F 21/10 |
| | | | | 726/26 |
| 2006/0107320 A1 | 5/2006 | Bhatt et al. | | |
| 2007/0107056 A1 | 5/2007 | Frank et al. | | |
| 2007/0233982 A1 | 10/2007 | Chen et al. | | |
| 2008/0022108 A1 | 1/2008 | Brannock et al. | | |
| 2008/0148001 A1 | 6/2008 | Gehrmann et al. | | |
| 2008/0312858 A1 | 12/2008 | Baseman et al. | | |
| 2009/0132624 A1 | 5/2009 | Haselsteiner et al. | | |
| 2009/0144559 A1 | 6/2009 | Lee et al. | | |
| 2010/0031026 A1* | 2/2010 | Cizas | ............... | G06F 21/76 |
| | | | | 713/156 |
| 2010/0082987 A1 | 4/2010 | Thom et al. | | |
| 2010/0174920 A1 | 7/2010 | Buckingham et al. | | |
| 2010/0198896 A1 | 8/2010 | Hoefler et al. | | |
| 2011/0029779 A1* | 2/2011 | Sekiya | ............... | G06F 21/72 |
| | | | | 713/176 |
| 2011/0088100 A1* | 4/2011 | Rutman | ............... | G06F 21/10 |
| | | | | 726/28 |
| 2011/0099361 A1 | 4/2011 | Shah et al. | | |
| 2011/0296440 A1* | 12/2011 | Laurich | ............... | G06F 21/602 |
| | | | | 719/326 |
| 2012/0210115 A1 | 8/2012 | Park et al. | | |
| 2012/0210124 A1 | 8/2012 | Lieber et al. | | |
| 2012/0221864 A1 | 8/2012 | Ciet et al. | | |
| 2012/0311314 A1 | 12/2012 | Cumming et al. | | |
| 2013/0081144 A1 | 3/2013 | Kambayashi et al. | | |
| 2014/0040625 A1 | 2/2014 | Belenky et al. | | |
| 2014/0247944 A1* | 9/2014 | Kocher | ............... | G06F 21/602 |
| | | | | 380/286 |

OTHER PUBLICATIONS

Altera Corporation, "OpenCore Evaluation of AMPP Megafunctions," Application Note 343, Version 1.0, Feb. 2004, 6 pages.

Huang, "The Detection of Counterfeit Integrated Circuit by the Use of Electromagnetic Fingerprint", H. Huang, "The Detection of Counterfeit Integrated Circuit by the Use of Electromagnetic Fingerprint", Sep. 1-4, University of Toulouse, 2014 International Symposium on Electromagnetic Compatibility, 1118-1122.

McGrew, "Efficient authentication of large, dynamic data sets using Galois/Counter Mode {GCM}", David McGrew, "Efficient authentication of large, dynamic data sets using Galois/Counter Mode {GCM}," Proceedings.

* cited by examiner

METHODS FOR CONTROLLING THE USE OF INTELLECTUAL PROPERTY IN INDIVIDUAL INTEGRATED CIRCUIT DEVICES

CROSS REFERENCE TO RELATED APPLICATIONS

This application claims the benefit of U.S. Provisional Application No. 61/945,387, filed on Feb. 27, 2014, the contents of which are incorporated herein by reference in their entirety.

BACKGROUND OF THE INVENTION

The present invention relates to integrated circuit technology. More particularly, the present invention relates to integrated circuit devices, such as user-programmable integrated circuits, which employ intellectual property (IP), and to methods for controlling the use of intellectual property in individual ones of the integrated circuit devices.

The use of integrated circuit devices including user-programmable integrated circuits has become widespread in the electronics industry. The expanding use of user-programmable integrated circuits as well as other integrated circuits has created a new business model, wherein third-party vendors have created and offer for sale custom software, firmware, and configuration files for programmable circuits that provide custom functions (known as "IP") that integrated circuit customers may purchase and load into the integrated circuit devices as a part of their circuit designs.

The growing use of IP in integrated circuit devices has given rise to a need to limit the use of the IP to authorized users; i.e., users who have paid a license fee for the privilege of incorporating the IP into their circuit designs. Misuse of IP includes outright piracy of IP for which no license fee has been paid to the third-party vendor, as well as "overbuilding" by programming the IP into a larger number of integrated circuit devices than is allowed under the licensing arrangement.

At least in the programmable integrated circuit field, the prior art has appreciated the problem of IP piracy and has provided some level of security for IP. Prior art solutions from user-programmable integrated circuit vendors, such as Xilinx and Altera, have, for example, provided that the IP is processed in an electronic design automation (EDA) tool flow which nominally maintains the confidentiality of the IP. Some of the schemes allow running the IP for a short time or while tethered to a computer. None of the existing prior art binds the license to individual devices the way the present invention does, nor provides for autonomous enforcement.

In some prior-art processes, a flow takes in encrypted register transfer level (RTL) files for the third-party IP and adds it to the user design. The schemes for enforcement vary from none to requiring the device to be attached to a programmer via a physical connection. It is thought that one vendor can limit the use of the IP from the time of reset by counting clock pulses, but there appears to be no scheme that can control IP on a per device basis with anything as flexible as the IP license certificate and enforcement block according to the present invention.

SUMMARY OF THE INVENTION

A method for controlling the use of intellectual property (IP) in an individual field programmable gate array (FPGA) includes loading a design file into the individual FPGA, the design file including at least one controlled IP circuit block, determining inside the individual FPGA whether the at least one controlled IP circuit block is authorized for use in the individual FPGA, enabling operation of the at least one controlled IP circuit block if the at least one controlled IP circuit block is authorized for use in the individual FPGA; and imposing a penalty on operation of the individual FPGA if the at least one controlled IP circuit block is not authorized for use in the individual FPGA.

DESCRIPTION OF THE INVENTION

Persons of ordinary skill in the art will realize that the following description of the present invention is illustrative only and not in any way limiting. Other embodiments of the invention will readily suggest themselves to such skilled persons.

Figure 1:
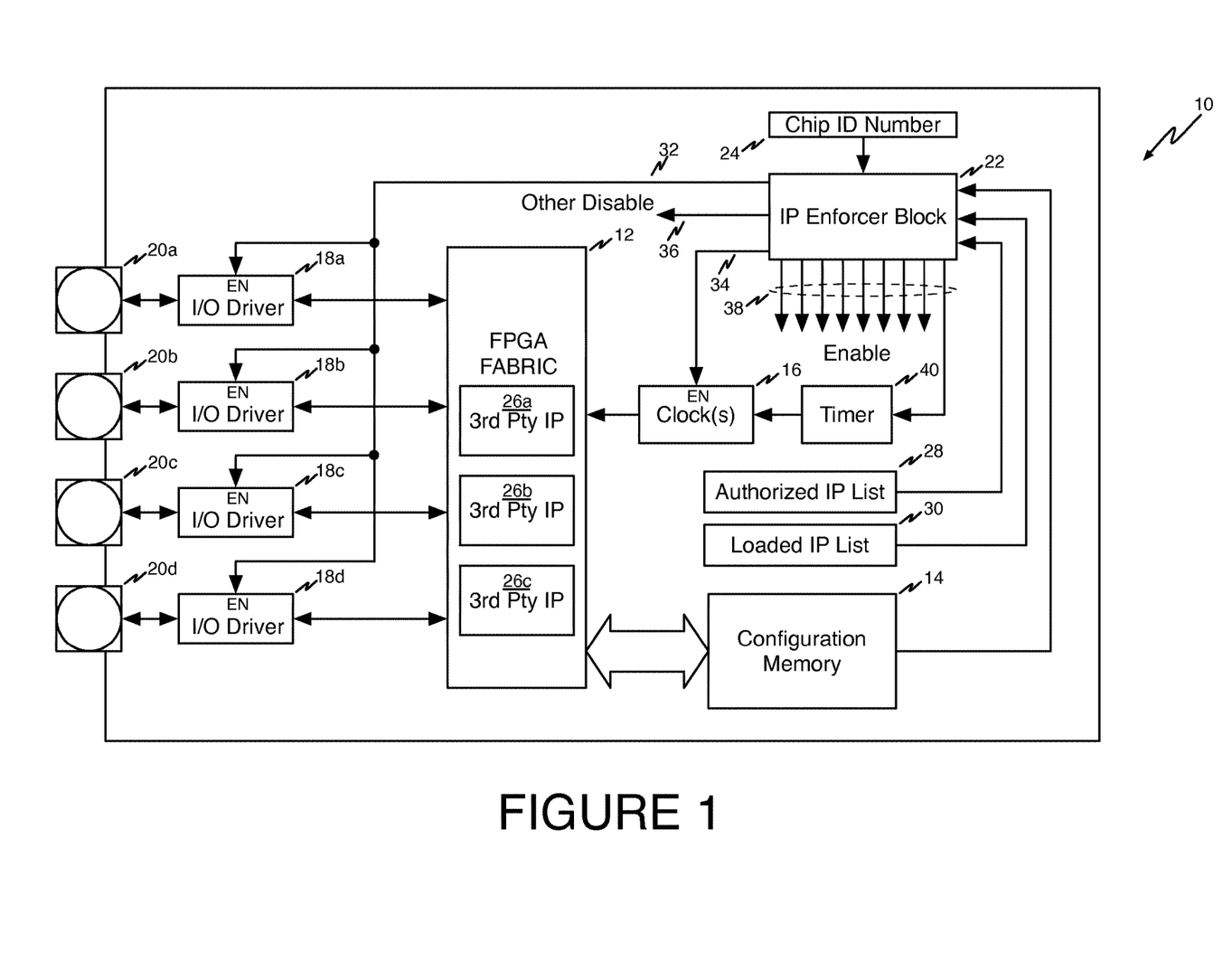
FIG. 1 is a block diagram of a field programmable gate array (FPGA) user-programmable integrated circuit including the features of the present invention.

Referring first to FIG. 1, a block diagram shows an illustrative embodiment of the invention, wherein a field programmable gate array (FPGA) user-programmable integrated circuit 10 includes the features of the present invention. FPGA 10 includes an FPGA fabric 12 of arbitrary size, including programmable circuits and interconnections as is known in the art. Persons of ordinary skill in the art will appreciate that the environment of an FPGA is merely an illustrative environment for the present invention, and that other types of integrated circuits that utilize IP in one form or another for one purpose or another (e.g., firmware, software, hardware configuration, etc.) fall within the scope of the present invention.

Configuration memory 14 is used to store the configuration data that defines the functions of the programmable circuitry and programmable interconnect architecture within the FPGA fabric 12. While FIG. 1 shows configuration memory 14 as a separate block in FPGA 10, persons of ordinary skill in the art will appreciate that an architecture can be employed, wherein configuration memory 14 is distributed throughout the FPGA fabric 12.

One or more clock circuits 16 are coupled to the FPGA fabric 12. Persons of ordinary skill in the art will understand that clock circuits could also be configured within the FPGA fabric, if desired. The FPGA fabric 12 is programmable and connectable to a plurality of input/output (I/O) driver circuits, represented by I/O driver circuits 18a through 18d. The I/O driver circuits 18a through 18d are coupled to a plurality of I/O pads, represented by I/O pads 20a through 20d, respectively.

An IP enforcer block 22 is included in FPGA 10. The function of IP enforcer block 22 is to identify the IP that has been loaded into the individual FPGA 10, determine whether that IP is authorized to be run in the individual FPGA 10, and provide a penalty if one or more items of the IP has not been authorized to be run in the individual FPGA 10. IP enforcer block 22 may include a state machine, a microcontroller, or microprocessor. These may be implemented as a hardwired portion of the circuit, or as a soft macro that is programmed into the FPGA fabric 12 using its configuration memory 14, even though it is shown as a separate block in the figure. Any firmware used in the implementation of the IP enforcer block 22 may be hardwired, such as with metal-mask ROM, or loaded into reconfigurable memory such as flash or even volatile memory such as SRAM.

IP enforcer block 22 is coupled to a chip ID number block 24, which identifies the individual integrated circuit with a unique ID number. This number may be created at the time of manufacture of the integrated circuit. The ID may be public data, i.e., accessible or known outside the integrated circuit, like a serial number, or private data, kept secret from non-authorized entities, like a cryptographic key, or a combination of both. Persons of ordinary skill in the art will readily appreciate the numerous ways that integrated circuits may be serialized. One especially good way of providing an individual chip ID number is to use a physically unclonable function (PUF). In this case, the ID is randomly determined by chip manufacturing processes that are difficult or impossible to control, thus making the ID both essentially unique to that chip (if the ID number extracted is sufficiently long and random enough to make ID collisions unlikely) and effectively unclonable. The PUF ID is typically kept private, thus adding to the difficulty in cloning it for an adversary to whom its value is not known. In that case, well-known cryptographic protocols, such as challenge-response protocols, can be used by the enforcer block to prove the integrated circuit has the correct secret PUF ID, without exposing the secret. These protocols can use either symmetric or asymmetric cryptographic techniques. Similar protocols can be used to create data that can be associated with the authorized IP list, cryptographically binding the authorized IP list to the PUF ID without exposing the secret PUF ID.

The IP enforcer block 22 uses the unique ID number of the integrated circuit to determine whether IP loaded into the integrated circuit and configured in the FPGA fabric 12 is authorized. FIG. 1 diagrammatically shows three different illustrative IP circuits 26a, 26b, and 26c configured in the FPGA fabric 12. Persons of ordinary skill in the art will appreciate that the number of IP circuits that can be authorized in accordance with the present invention is arbitrary and will depend somewhat on the size of the FPGA as well as the size of the user design employing the IP.

IP enforcer block 22 is coupled to Authorized IP list 28 and Loaded IP List 30. IP list 28 is a memory block in which a list of the IP items authorized for use in the individual FPGA 10 is stored and Loaded IP List 30 is a memory block in which a list of the IP items actually loaded into the individual FPGA 10 is stored. Additional data, such as the ID number of the authorized chip, is typically stored with the Authorized IP list 28. Another type of optional additional data is information related to licensing terms, such as the mode of use, features that are to be enabled or disabled, restrictions of length of time an IP can be used, and other license terms and conditions, etc., that the IP enforcer block 22 can use to decide when to activate features or apply penalties under different conditions.

The IP lists 28 and 30 may be stored in any type of non-volatile memory. For example, they may be stored in on-chip flash memory. They also could be stored off-chip and loaded into volatile memory during the power-up boot sequence of the FPGA (or microcontroller), so long as the data is adequately protected against tampering during storage and loading. Techniques for authenticating off-chip data during loading are well known by FPGA (and MCU) architects and users, and these may entail storing some sort of trust anchor, such as a symmetric or public cryptographic key or message digest (hash) on-chip in non-volatile memory, or the use of some other persistent property of the device, such as a PUF, to assist in the authentication process.

Though shown as a separate block, the Loaded IP List 30 could be distributed amongst the third-party IP circuits 26a, 26b, 26c as metadata or as a watermark that identifies each block, so long as it is possible for IP enforcer block 22 to extract identification data for all of the controlled IP circuits 26a-26c included in the design for comparison to the Authorized IP List 28.

The illustrative IP enforcer block 22 in FIG. 1 is shown having several outputs. A first output 32 is shown coupled to enable inputs of the I/O driver circuits 18a through 18d. According to the present invention, an IP enforcer block 22 may be used to selectively disable some or all of the I/O driver circuits 18a through 18d on the individual integrated circuit 10 as a penalty for loading unauthorized IP into the individual integrated circuit 10. Persons of ordinary skill in the art will appreciate that I/O driver circuits 18a through 18d may normally include enable inputs so that unused ones may be placed into a high-impedance state or another known state, such as VDD or ground. The IP enforcer block 22 is coupled to one or more I/O block enable inputs to implement this embodiment of the invention.

A second output 34 of the IP enforcer block 22 is shown coupled to the enable input of the clock circuit 16. According to the present invention, an IP enforcer block 22 may be used to selectively disable some or all of the clock circuits 16 on the individual integrated circuit 10 as a penalty for loading unauthorized IP into the individual integrated circuit 10.

A third output 36 of IP enforcer block 22 is also shown. Such an output may be used to selectively disable other features of the integrated circuit 10 as a penalty for loading unauthorized IP into the individual integrated circuit 10. The number of circuit functions that can be disabled using output 36 of IP enforcer block 22 in accordance with the present invention is almost limitless, and is left to the imagination of the skilled designer.

According to another aspect of the present invention, IP enforcer block 22 may include one or more enable outputs (shown together as reference numeral 38). Enable outputs 38 may be used to enable one or more levels of additional optional functionality in the individual integrated circuit 10. According to this feature of the present invention, additional optional features of one or more authorized IP blocks may be enabled using one of the outputs 38. The number and types of optional functionality that can be provided according to this aspect of the invention are as limitless as the imagination of the designer of the IP block. As an example of this feature of the present invention, the rightmost of the enable outputs 38 is shown coupled to a timer 40. In this illustrative embodiment of the invention, IP enforcer block 22 may allow a "demonstration" mode of operation of the integrated circuit 10 containing the IP, whereby a portion of the clock circuit 16 is allowed to operate until a timeout occurs to shut down the timed feature. The timeout could additionally trip any or all of the other penalties, such as the aforementioned I/O disables. The timeout could be set for a period that is long enough to allow a user to determine that the IP block functions satisfactorily for its intended purpose, but not so long that the demonstration mode can be used in the end application without the need for longer or perpetual activation, such as would be provided with a different license.

The provision of a plurality of enable outputs 38 from the IP enforcer block 22 can be used for a large number of functions, such as implementing the demonstration mode just described. Some of the enable outputs 38 can be associated with particular IP blocks and can be set or cleared based on the terms and conditions of the license for that IP, or to personalize the IP for the user's application, or to serialize or identify or customize the IP on a per-chip or per-project or per-customer basis, or any of a number of other possible uses that the IP vendor for that particular IP may choose.

Figure 2:
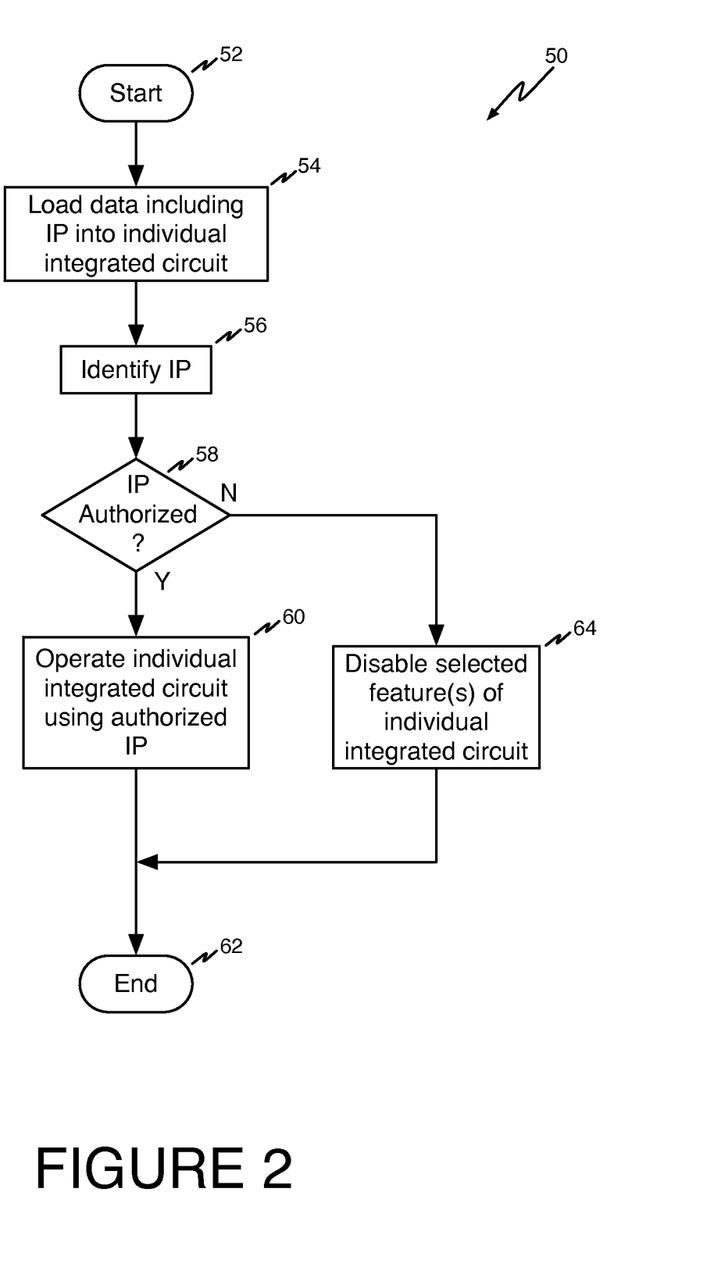
FIG. 2 is a flow diagram depicting an illustrative method for controlling the use of IP in individual integrated circuit devices.

Referring now to FIG. 2, a flow diagram shows an illustrative method 50 for controlling the use of IP in individual integrated circuit devices according to the present invention. The method begins at reference numeral 52.

At reference numeral 54, data, including one or more items of IP, is loaded into the individual integrated circuit. The loading of data will differ depending on the nature of the integrated circuit, the data entry protocol, and individual hardware system, as will be appreciated by persons of ordinary skill in the art.

At reference numeral 56, the items of IP loaded into the integrated circuit as part of the data are identified. At reference numeral 58, it is determined whether the IP loaded into the individual integrated circuit is authorized for use in the individual integrated circuit. As will be appreciated by persons of ordinary skill in the art, modern integrated circuit technology provides ways to identify and serialize individual ones of otherwise functionally identical integrated circuits. The process performed at reference numeral 58 examines the data loaded into the integrated circuit, which examination includes identifying which items of intellectual property are authorized for an individual integrated circuit.

If the item(s) of intellectual property loaded into the individual integrated circuit as part of the data are authorized for the individual integrated circuit, operation of the individual integrated circuit is permitted at reference numeral 60 and the process ends at reference numeral 62.

If, however, it is determined at reference numeral 58 that the item(s) of IP loaded into the individual integrated circuit are not authorized for the individual integrated circuit, selected features of the operation of the individual integrated circuit are disabled at reference numeral 64 and the process ends at reference numeral 62. Persons of ordinary skill in the art will observe that any of the features of the individual integrated circuit, such as clocks, data paths, I/O systems, may be disabled. Such details are easily left up to the integrated circuit designer as a matter of design choice.

Figure 3:
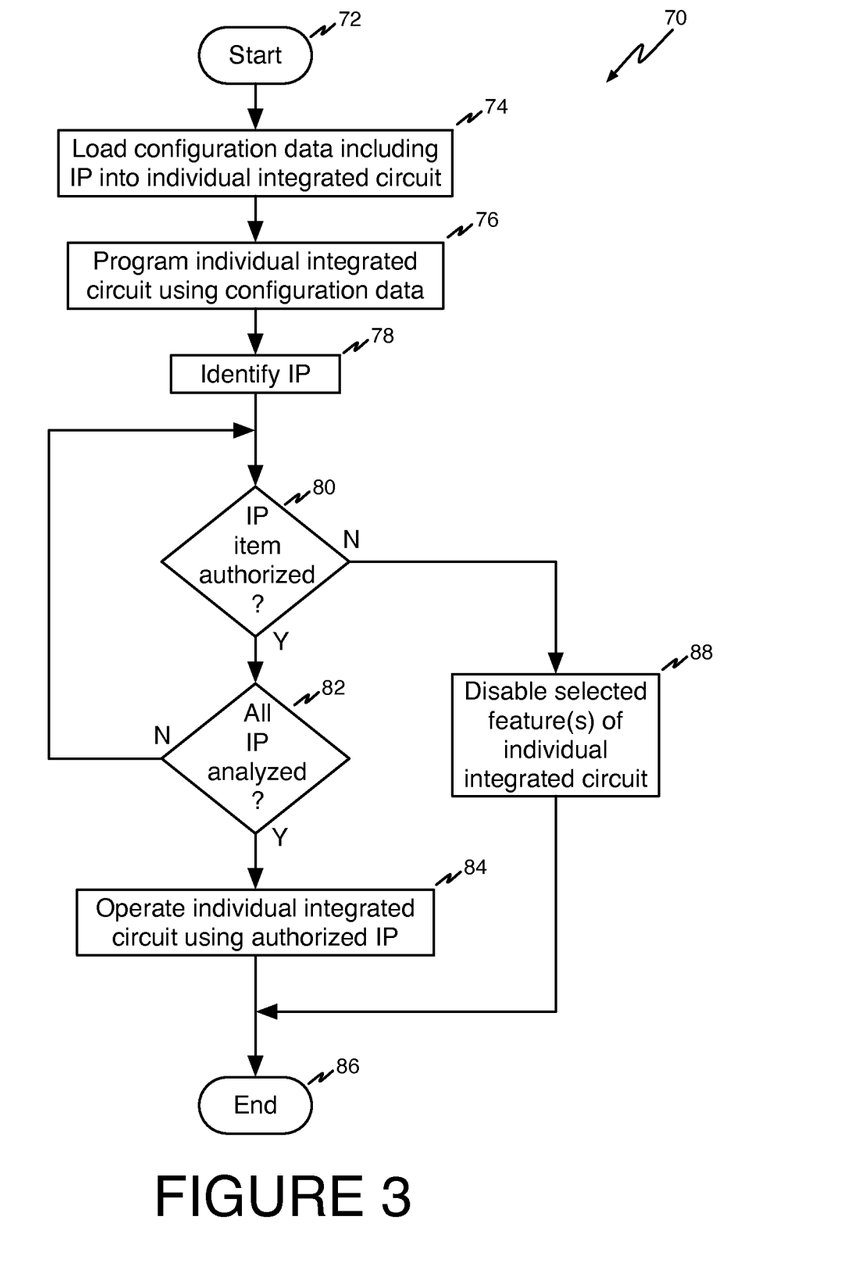
FIG. 3 is a flow diagram depicting an illustrative method for controlling the use of IP in individual integrated circuit devices where selected features of the individual integrated circuit are disabled when unauthorized IP is loaded into the integrated circuit.

Referring now to FIG. 3, a flow diagram depicts an illustrative method 70 for controlling the use of IP in individual integrated circuit devices where selected features of the individual integrated circuit are disabled when unauthorized IP is loaded into the integrated circuit. The method of FIG. 3 is disclosed in the context of a user programmable integrated circuit, such as an FPGA integrated circuit, but persons of ordinary skill in the art will easily be able to practice this aspect of the present invention with respect to other types of integrated circuits. The method begins at reference numeral 72.

At reference numeral 74, configuration data, including one or more items of IP, is loaded into the individual integrated circuit. The loading of configuration data will differ depending on the nature of the integrated circuit, the data entry protocol, and individual hardware system, as will be appreciated by persons of ordinary skill in the art. Persons of ordinary skill in the art will also appreciate that the data could be other data, for example, firmware to control, or a software program to run on, a microcontroller or microprocessor contained in the integrated circuit.

At reference numeral 76, the individual integrated circuit is programmed using the loaded configuration data. At reference numeral 78, the items of IP loaded into the integrated circuit as part of the data are identified.

At reference numeral 80, it is determined whether a first identified item of the IP loaded into the individual integrated circuit is authorized for use in the individual integrated circuit. If use of the IP is authorized, the process proceeds to reference numeral 82 where it is determined whether authorization for all IP loaded into the individual integrated circuit has been determined. If all IP has been analyzed, the individual integrated circuit may be operated at reference numeral 84 and the process ends at reference numeral 86.

If it is determined at reference numeral 82 that all IP has not been analyzed, the process returns to reference numeral 80, where the next identified item of the IP loaded into the individual integrated circuit is authorized for use in the individual integrated circuit. As will be appreciated by persons of ordinary skill in the art, this can be accomplished by, for example, incrementing a pointer that keeps track of the items of IP. If use of the IP is authorized, the process again proceeds to reference numeral 82 where it is determined whether authorization for all IP loaded into the individual integrated circuit has been determined.

If it is determined at reference numeral 80 that the item of IP being examined is not authorized for use in the individual integrated circuit, the process proceeds to reference numeral 88, where selected features of the operation of the individual integrated circuit are disabled. It should be apparent to persons of ordinary skill in the art that when multiple IP blocks are present, it is possible to analyze them in series, as implied, or in parallel, at the discretion of the designer. The process ends at reference numeral 86.

Figure 4:
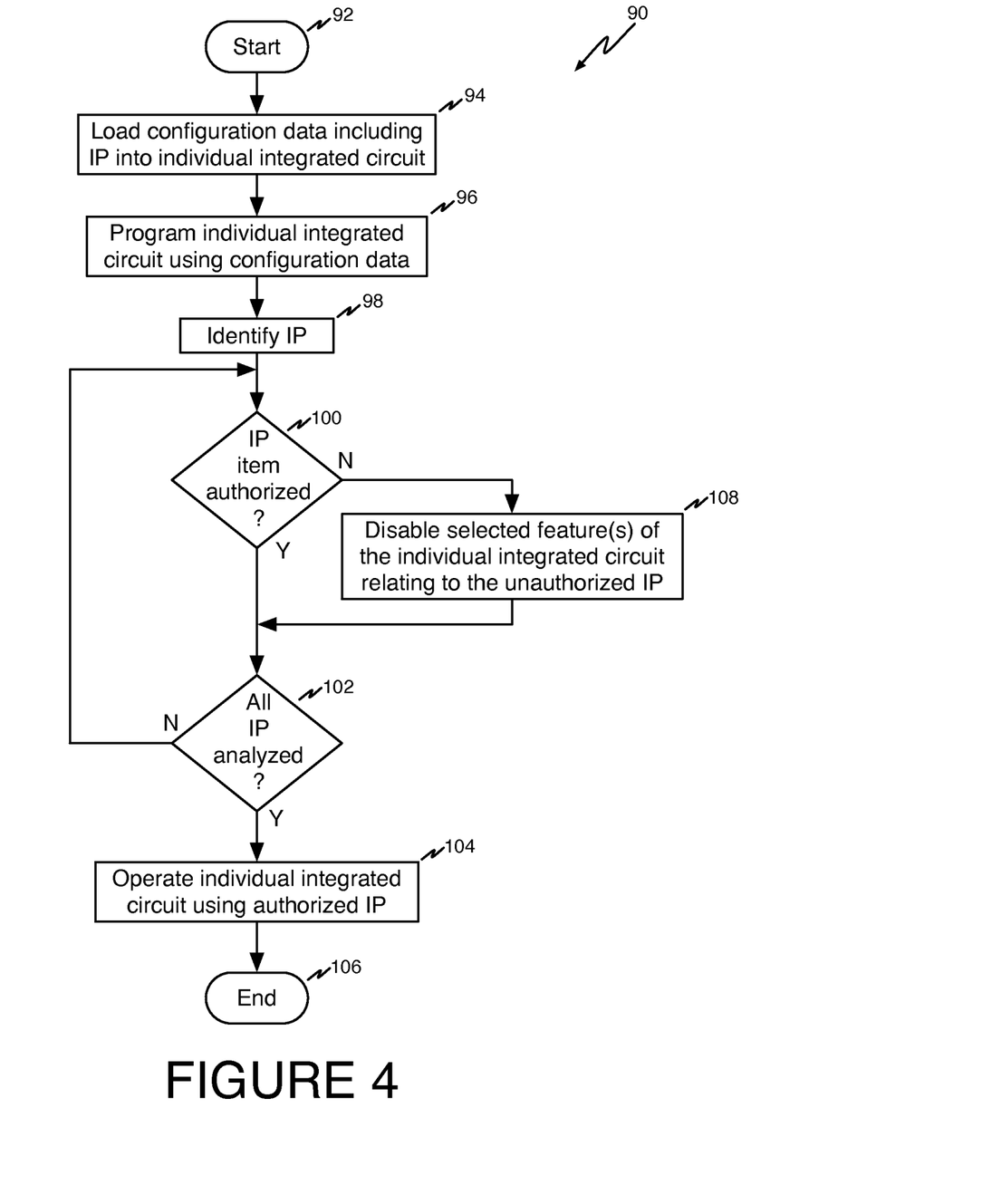
FIG. 4 is a flow diagram depicting an illustrative method for controlling the use of IP in individual integrated circuit devices where selected features of the individual integrated circuit relating to running an individual item of unauthorized IP are disabled when an item of unauthorized IP is loaded into the integrated circuit.

Referring now to FIG. 4, a flow diagram depicts an illustrative method 90 for controlling the use of IP in individual integrated circuit devices where selected features of the individual integrated circuit relating to running an individual item of unauthorized IP are disabled when an item of unauthorized IP is loaded into the integrated circuit. The process begins at reference numeral 92.

At reference numeral 94, configuration data, including one or more items of IP, is loaded into the individual integrated circuit. The loading of configuration data will differ depending on the nature of the integrated circuit, the data entry protocol, and individual hardware system, as will be appreciated by persons of ordinary skill in the art. Persons of ordinary skill in the art will also appreciate that the data could be other data, for example, firmware to control, or a software program to run on, a microcontroller or microprocessor contained in the integrated circuit.

At reference numeral 96, the individual integrated circuit is programmed using the loaded configuration data. At reference numeral 98, the items of IP loaded into the integrated circuit as part of the data are identified.

At reference numeral 100, it is determined whether a first identified item of the IP loaded into the individual integrated circuit is authorized for use in the individual integrated circuit. If use of the IP is authorized, the process proceeds to reference numeral 102 where it is determined whether authorization for all IP loaded into the individual integrated circuit has been determined. If all IP has been analyzed, the individual integrated circuit may be operated at reference numeral 104 and the process ends at reference numeral 106.

If it is determined at reference numeral 102 that all IP has not been analyzed, the process returns to reference numeral 100, where the next identified item of the IP loaded into the individual integrated circuit is authorized for use in the individual integrated circuit. As will be appreciated by persons of ordinary skill in the art, this can be accomplished by, for example, incrementing a pointer that keeps track of the items of IP. If use of the IP is authorized, the process again proceeds to reference numeral 102 where it is determined whether authorization for all IP loaded into the individual integrated circuit has been determined.

If it is determined at reference numeral 100 that the item of IP being examined is not authorized for use in the individual integrated circuit, the process proceeds to reference numeral 108, where selected features of the operation of the individual integrated circuit relating to the unauthorized IP are disabled. The process proceeds to reference numeral 102, where it is determined whether authorization for all IP loaded into the individual integrated circuit has been determined. The process then proceeds as previously described. It should be apparent to persons of ordinary skill in the art that when multiple IP blocks are present, it is possible to analyze them in series, as implied, or in parallel, at the discretion of the designer.

Persons of ordinary skill in the art will appreciate that the difference between the method depicted in FIG. 3 and the method depicted in FIG. 4 is that, in the method depicted in FIG. 4, the individual integrated circuit may still be operated using the authorized IP and that one or more features relating only to the unauthorized IP are disabled, whereas, in the method depicted in FIG. 3, the penalties imposed may disable one or more critical functions and make the entire integrated circuit effectively inoperable for its intended use.

According to one aspect of the present invention, a method for controlling the use of intellectual property in FPGAs on a per-device basis may be implemented using an IP license certificate. An IP license certificate that lists all of the allowable (i.e., authorized) controlled IP for use on a particular FPGA device is issued, i.e., generated and digitally signed by a certificate authority (or its proxy) acting on behalf of the third-party IP vendor(s). The certificate includes additional required and optional data as discussed above, for example, the public ID number of the authorized chip and possibly additional data describing license conditions, or cryptographic data binding the certificate to a secret key or ID, such as a secret PUF ID. This certificate is cryptographically verified by an IP enforcer block 22 either hardwired into the FPGA or inserted in the IP design by the design tools. If the verification fails, the IP enforcer block 22 imposes penalties, for example, shutting down all of the I/O on the device or stopping the clocks. The certificate can be cryptographically bound to an individual device via a public or private integrated circuit ID (or both), thus preventing overbuilding of the IP by controlling the number of IP license certificates issued. The IP enforcer block 22 compares the serial number or other individual integrated circuit identifier in the device with the information in the IP license certificate, thus verifying the certificate was issued for that individual integrated circuit, meaning that the included list of authorized IP is, therefore, validly licensed for that individual integrated circuit.

In a typical scenario according to the present invention, a user buys license(s) from third-party IP suppliers. The IP vendors give the user "IP tickets" indicating the number of authorized licenses that have been purchased. A project-specific RSA key pair is generated by the user's hardware security module (HSM). The RSA public key is transmitted to an authorized programming tool and authenticated. The user creates a design containing the controlled third-party IP and optionally specifies a feature bit string (per project or per device) to output as discrete logic signals. The design software (such as Libero® available from Microsemi SoC Corporation of San Jose, Calif.) automatically inserts the IP enforcer block 22 into the design, including the trusted RSA public key and a list of included IP inserted into eNVM, and a hash of these compiled into the FPGA fabric 12. The user authorizes production by generating what is termed a "job ticket" containing information to authorize loading of the user bitstream into a controlled number of devices per the user's wishes (for example, using device-specific authorization codes as described in co-pending application Ser. No. 14/485,833, filed Sep. 15, 2014, which is expressly incorporated herein by reference), as well as to authorize IP licenses via IP license certificates per the IP vendors' wishes. The job ticket can consolidate the authorizations given by one or more IP vendors via their IP tickets, which will be described further below. The job ticket is securely transferred to the production HSM in a one-time transaction that prevents replaying of the same job ticket to overproduce a second (or more) batch of devices.

Some FPGAs or other user programmable integrated circuits are shipped to the user with not only a serial number but also with a cryptographic device ID certificate that includes the device's public serial number, model number, and other data that binds the ID certificate to the individual integrated circuit, such as a public key. (The device ID certificate with which the original component manufacturer binds the serial number and model number to an individual device is not to be confused with the device IP license certificate which will be added after the user receives the devices and which is used to bind the list of authorized third-party IP to the device.) At production time, if the device ID certificate and its signature are verified as valid, then the device ID certificate is genuine, the serial number and model number belong to the same device. If the device validates the key(s), symmetric or asymmetric, associated with the device ID certificate properly, then the device ID certificate is bound to the device, which is now verified as a genuine device. Therefore, since the device is proven to be genuine, a validated PUF response from the device can safely be used in generating a device IP license certificate.

The production HSM securely extracts the PUF response and the serial number for the current individual device, programs the user bitstream including the IP enforcer block 22 and associated eNVM data and hash, without limitation; generates, signs, and programs the individual device IP license certificate into the individual programmable integrated circuits 10 according to user and IP vendor security policies that prevent overbuilding (for example, using device-specific authorization codes as disclosed in Appendix A filed herewith).

At run time, if the hash is verified as valid, the included IP list and RSA public key can be trusted. If the IP license certificate signature is verified as valid, then the approved IP list can be trusted. If the current PUF response matches that enrolled in the certificate, then the IP license certificate is bound to the device. If the included IP list is a subset of the approved IP list, then the device is authorized to run the included IP.

Figure 5:
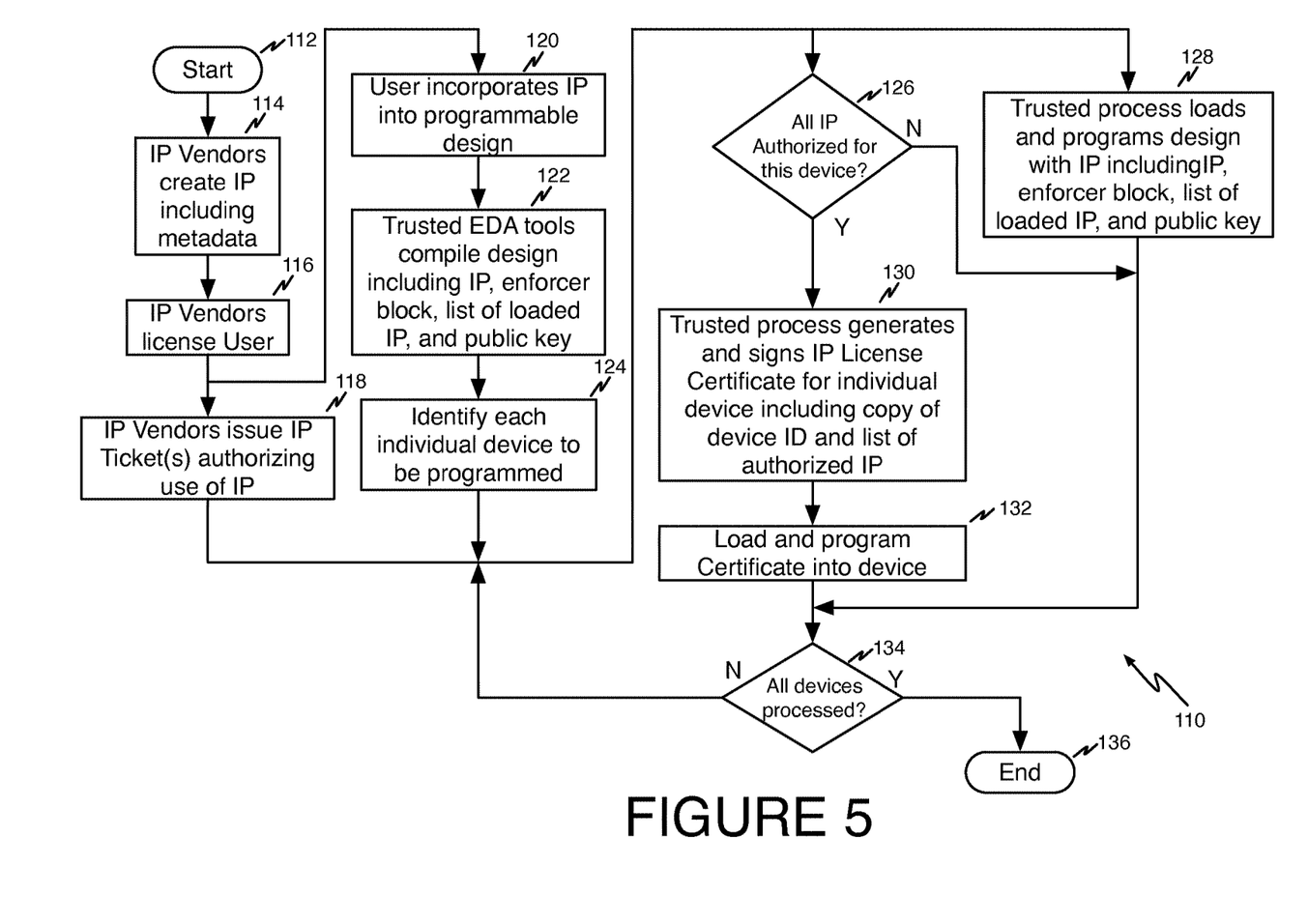
FIG. 5 is a flow diagram depicting an illustrative method for selectively generating and programming into an individual integrated circuit an IP license certificate and public key that can be used by the device to determine if the loaded controlled IP is authorized.

Referring now to FIG. 5, a flow diagram shows an illustrative method 110 for loading of an IP license certificate and a trusted public key into an individual integrated circuit as described briefly in the previous several paragraphs. The IP license certificate contains the authorized IP list, the ID of the authorized integrated circuit 10, and optionally other data such as relevant licensing terms and conditions. The trusted public key is the other half of a key pair also including the private key which was used to digitally sign the IP license certificate. The flow starts at reference numeral 112.

At reference numeral 114, the IP vendor(s) create their controlled IP. This may include the IP proper, plus additional metadata such as the IP identifier, licensing terms and conditions such as allowable modes of use, for example, a demo mode may be authorized for the particular IP, even without an additional license, based on the IP's metadata alone. In that case, a truncated flow could be used where the IP enforcer block 22 allows limited use of the controlled IP according to its metadata, without need for an individual device IP license certificate. Individual licenses may not be that advantageous for demo mode since it may be limited in such a way that it is not really suitable for production systems and, thus, overbuilding is not much of a concern. Alternatively, for some modes of use, for example in normal run-time use in production systems, an individual device IP license certificate may be required by the IP vendor to control overbuilding of the controlled IP. IP metadata could include, for example, a version number for the IP, or a date or date range associated with the IP, or an arbitrary sequence number, or a nonce. The IP license certificate could, likewise, have additional rule-related data beyond just identifying the IP and the authorized device ID, such as a version number range or a date range, as well as it could have a specific date associated with the certificate, or a specific sequence number, or a nonce. The IP enforcer block 22 could then implement restrictive or expansive rules based on these additional rule-related data elements. For example, the date or version associated with the IP via its metadata could be required to be within a date range or version range specified in the IP license certificate. More complex rules, such as requiring a non-null intersection between a date range in the IP metadata and a date range in the IP license certificate, are also possible. For yet another couple of examples, an IP could have metadata that prevents it from being authorized by IP license certificates older than a given date; or IP license certificates could be generated having rule data that only authorize future versions of the IP up to a certain distance into the future. Data supporting various rules, from simple to complex, for controlling the use of the IP may, thus, optionally be encoded into the IP metadata or alternatively the device IP license certificate, or a combination of both, depending on the nature of the limitation and the IP vendor's needs and desires. Together, this data can be used by the IP enforcer block 22 as additional criteria in deciding whether to impose a penalty.

In the usual case where additional licensing is required, the flow proceeds to reference numeral 116 where the IP vendor(s) grant a license/licenses to the user. This would normally be the result of some agreement between each of the IP vendors and the user. This could involve custom negotiated agreements. However, one of the potential advantages of the present invention is that it can facilitate simpler, more standardized, licensing arrangements. For example, in order to use the IP, the user may be required to accept a standardized "check-box" license that is used by all such users of that IP. Multiple IP vendors may standardize on a common IP license agreement, or a small set of such standardized agreements. Standardization on legal agreements can help reduce costs for everyone and help in creating a more liquid market in IP.

At reference numeral 118, the IP vendor(s) issue what is being termed as an "IP Ticket," digitally authorizing the use of the IP on a certain set of programmable integrated circuits, such as FPGAs or MCUs. This IP ticket includes an identifier for the IP and would typically also include a limit on the number of individual integrated circuits for which the IP is licensed. It may also include, without limitation, other digitally-encoded licensing terms and conditions, and customization data.

Each unique IP ticket is constructed and used in a protocol in such a way that it can only be generated and used once in order to prevent overbuilding of the IP it authorizes by reusing an IP ticket multiple times. For example, one such protocol for preventing reuse of IP tickets is where the authorized HSM that will consume the IP ticket generates a nonce that is sent to the IP vendor who uses it in the construction of his IP ticket. The completed IP ticket is sent back to the HSM, authorizing it to generate a finite number of device IP license certificates. If the protocol for submitting an IP ticket is run another time, the HSM will generate a different nonce and will only accept a fresh IP ticket generated using the new nonce. If an adversary tries to pass off the earlier IP ticket, trying to allow the construction of more device license certificates than were intended, the HSM will recognize that the nonce is not the fresh one used in the current instance of the protocol and will reject it.

Potentially in parallel, the user incorporates the IP into their programmable design at reference numeral 120. Several controlled IP blocks from one or more IP vendors may be incorporated in the user's design, along with the user's own IP. At reference numeral 122, the user compiles the design, targeting the chosen type of programmable integrated circuit. In this embodiment, the EDA tool automatically augments the compiled design with additional elements, namely the IP enforcer block 22, a list of the identifiers of the controlled IP that is included in the design (the "loaded IP" list 30), and a public key whose associated private key is to be utilized in signing the IP license certificate, as described above. The best security is obtained if the public/private key pair is generated by the HSM that will be used to sign the device IP license certificates with the private key. That way, the private key needs never be exported from the HSM. Security is also enhanced if a different key pair is used for each project as opposed to using the same key pair for many projects, thus reducing the consequences if somehow a private key is discovered. The public key is exported to the EDA tools, which authenticate it. The EDA tools must be trusted to compile the list of controlled IP correctly, and to insert the correct (i.e., authenticated) public key. It should be difficult to tamper with these data items. For example, when completing the bitstream that will be used to load the design and associated data into the programmable devices, the EDA tools can use encryption and authentication techniques to protect the integrity of the critical data, as is well known in the field.

The group of devices to be configured with the design are identified at reference numeral 124. This typically involves reading at least a portion of each of the device's ID data. Often, this step is deferred until almost the moment the devices are programmed, for example, after the circuit boards are assembled with the devices. Then, an in-circuit programming method suitable for that device may be used to read the device ID information and then, moments later, to program the device in-situ.

At reference numeral 126, it is determined whether, according to the license terms and conditions, each individual integrated circuit is duly licensed for each of the controlled IP blocks listed in the IP tickets generated at reference numeral 118. This should be done by a trusted process, such as may be executed by an HSM programmed to perform this task. The trusted process may, for example, be performed by a trusted HSM local to the manufacturing process, or using an information communication service such as the internet and a remote server that may have a trusted HSM attached to it. The HSM can examine each of the IP tickets from each of the IP vendors, and keep track of the number of authorized devices and IP license certificates issued so far compared to limits read from the IP tickets. If all of the IP is authorized for the device in question, the process moves on to reference numerals 130 and 132, otherwise it skips these two steps. Though not explicitly shown in the flow diagram, there may be intermediate steps such as where production job information from the user (including the number of authorized systems to build) and license information regarding the IP ticket(s) from each IP vendor is consolidated into, for example, a single job ticket as previously defined.

If all of the loaded IP is authorized, the trusted process, running on for example an HSM, generates an IP license certificate for that individual integrated circuit, including a list of the authorized IP and the authorized device ID (as shown at reference numeral 130). Additional data that more strongly binds the certificate to the individual device, such as may be related to a secret key stored in the device, or an identifier (public or secret) derived from a PUF of the device may optionally be part of the certified data. Additional data associated with the one device or with particular IP blocks or the particular user project may also optionally be included in the IP license certificate. For example, the certificate could include a bit string that drives output binary signals from the IP enforcer block 22, such as those identified collectively by reference numeral 38 in FIG. 1. In this embodiment, the certificate is digitally signed using a private key protected by the HSM. This private key is the other half of the key pair comprised of this key and the public key that was added as additional data to the compiled design by the EDA tool at reference numeral 122. Thus, the device, more specifically the IP enforcer block 22, will later be able to verify the digital signature on the certificate using the inherently trusted public key. The HSM acts as a trusted proxy for all of the IP vendors. By only signing individual device IP license certificates when authorized to do so by properly authenticated vendor IP Tickets, the HSM respects the will of the IP vendors in the IP license certificates it generates and signs at block 130. At reference numeral 132, the certificate is loaded into long-term programmable non-volatile memory. In flash FPGAs, this would typically be embedded non-volatile flash memory (eNVM) within the device, but it could be an external PROM or memory inside another device.

Optionally, in parallel with the generation and programming of certificates at reference numerals 126, 130, and 132, the individual integrated circuits are also programmed at reference numeral 128 with the design and the associated data that was compiled at reference numeral 122. This should preferably be a trusted process in that it should be difficult to tamper with the configuration data, and with the list of loaded IP and the public key, in particular. Also, it should preferably be difficult to extract and reverse engineer or clone the controlled IP. These goals can be achieved using bitstream/firmware encryption and authentication techniques as are known in the art. One advantage of this embodiment is that it decouples the generation and programming of the design and associated data from the generation and programming of the IP license certificates, so they may be done at the same or, perhaps more conveniently, at different times. It allows customization or serialization of the IP on a per device, per project, or per customer basis, for example using the signals identified at reference numeral 38, using the IP license certificate rather than having to customize the IP itself.

All of the devices identified at reference numeral 124 are processed; and for each device that is authorized by the vendors' IP Ticket(s), an IP license certificate is generated and programmed, and also the design is programmed. If there are additional identified devices that haven't been processed, as detected at reference numeral 134, the loop iterates by continuing with the next such device at reference numerals 126, 128. After all of the identified devices are processed, the method ends at reference numeral 136. Note that only the number of devices authorized by all the vendors' IP Tickets receive IP license certificates authorizing those devices to run the controlled IP. Additional devices may or may not be programmed with the design and additional associated data, which is usually common across a whole project, but they do not receive IP license certificates. The number of devices that the IP can execute on is, thus, tightly controlled by the number of devices that receive valid IP license certificates.

Figure 6:
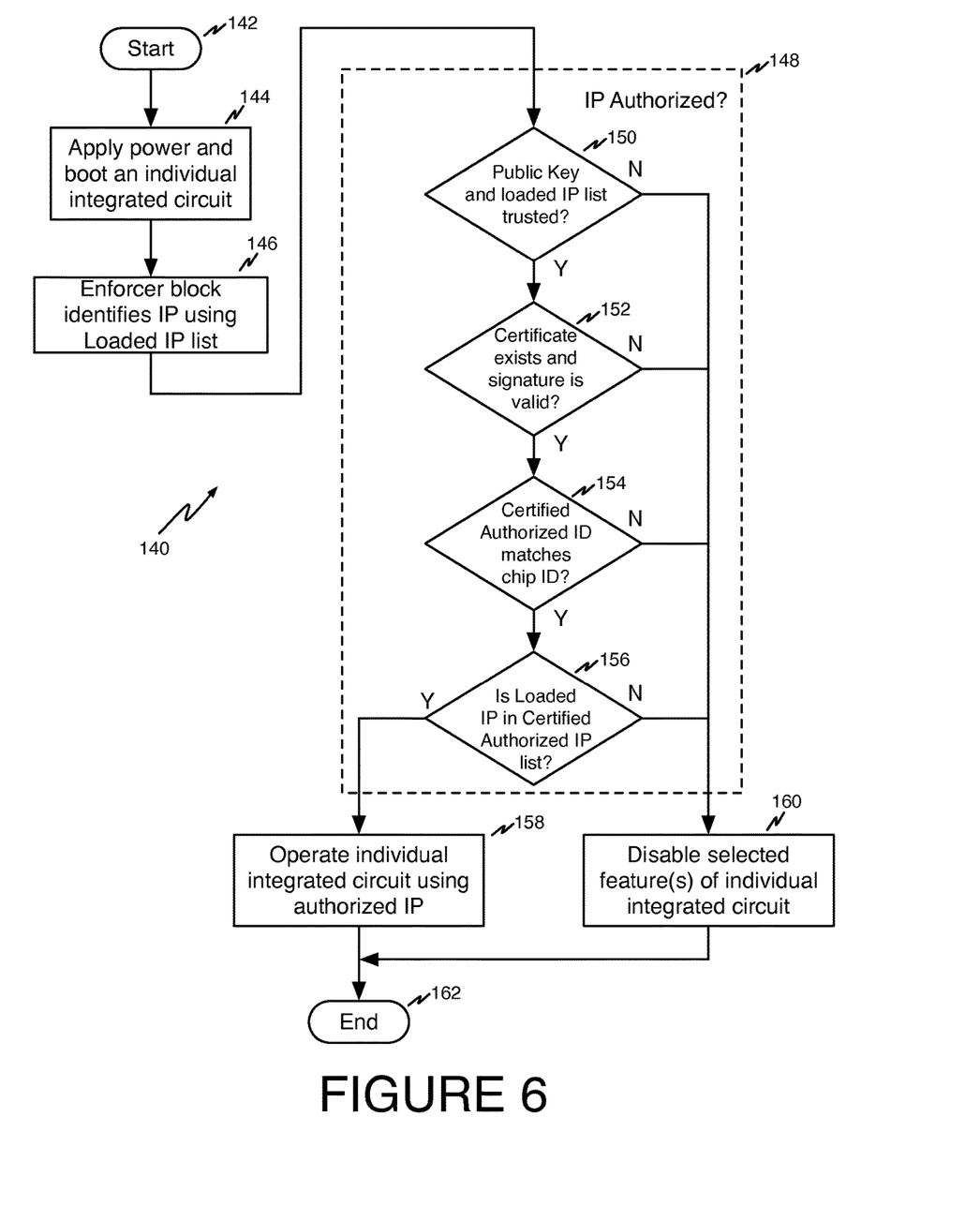
FIG. 6 is a flow diagram depicting an illustrative method for controlling the use of IP in individual integrated circuit devices where an IP license certificate and public key are used to limit the use of the controlled IP according to the license restrictions intended by the IP vendor.

Referring now to FIG. 6, a flow diagram illustrates a method 140 which expands upon the method 50 of FIG. 2 by showing additional detail in the step in which the IP enforcer block 22 determines if the loaded IP is authorized using an embodiment where an IP license certificate containing the list of authorized IP blocks has been stored at a location where the IP enforcer block 22 can read it, as described above in method 110 of FIG. 5. The process starts at reference numeral 142.

In FIG. 6, reference numeral 144 designates an individual integrated circuit containing the controlled IP and possibly also containing the IP license certificate which authorizes its use is powered-up and boots itself. In reference numeral 146, the enforcer block 22 identifies all the controlled IP that is loaded, e.g., by examining a list that was generated by the EDA tool and inserted into its memory, as described above in relation to loaded IP list 30.

In a series of sub-steps identified collectively by reference numeral 148, it is determined if all of the loaded IP is authorized. Shown at reference numeral 150 as the first test is checking the integrity of the public key and the list of loaded controlled IP from authorized IP list 28. These may be inherently trusted, in which case the outcome is always "Yes", or a more rigorous test can be conducted. One method of doing this is to store a message digest (hash) of these items in a secure location. For example, the public key and the list of loaded IP may be stored in embedded non-volatile memory in a flash FPGA, and the hash of these may be stored in the logic configuration memory of that same FPGA. While all of these may be compiled at roughly the same time, it is possible to load them at different times. For instance, the hash may be loaded at the same time as the design, while the list of IP and the public key may be loaded later, for example with the IP license certificate. With the hash, the enforcer block 22 will be able to detect any tampering with the list of loaded IP or with the public key, thus reducing somewhat the need to protect them as securely while in transit or at rest. If the integrity of the list and key are verified (or inherently trusted), then the checks proceed with the next check at reference numeral 152, or, in the case of a failure, the flow proceeds to reference numeral 160.

Shown as the second check (at reference numeral 152) is verification of the IP license certificate and its digital signature. The trusted public key verified at reference numeral 150 as described just above is used to verify the signature on the IP license certificate. This process also verifies the integrity and authenticity of the contents of the IP license certificate, including the list of authorized IP and the authorized device ID and any other device binding information or other licensing terms and conditions as may be present. A valid digital signature proves the integrity of the signed data, and its authenticity, i.e., that it was signed by the owner of the private/public signing key pair. Assuming the private key is appropriately managed and used, this means that the controlled IP is only authorized for use on the one device as listed in the certificate. If the IP license certificate and its digital signature are successfully verified, the next check, reference numeral 154, is performed, or, in case of failure, the flow continues at reference numeral 160.

The check at reference numeral 154 is to verify the authorized ID listed in the IP license certificate and verified in the previous step matches the ID of the device the enforcer block 22 is running on. In the simplest case, the only ID might be a public serial number; then the certified authorized serial number is simply matched with the serial number of the current device. More secure identification means are also possible. For example, the device may be asked to prove it knows a certain secret key, which has associated verifiable information encoded in the certificate. A well-known example of this would be to include a device-specific public key in the certificate, and then at boot time the enforcer block 22 could require the device to prove it knows the secret key associated with the device-specific public key. Several well-known algorithms can be used to perform such a check. Another security-enhancing technique would be to bind the certificate to a PUF in the device, making it even more difficult to fraudulently overbuild the authorized IP into other similar devices, each of which would have a unique PUF of its own. The enforcer block 22 would challenge the PUF and verify the PUF's response matches that certified in the device's IP license certificate. If the verification of the device ID succeeds, then the flow proceeds to the next verification step (reference numeral 156), otherwise it continues at reference numeral 160.

The final verification step in this method is shown at reference numeral 156. The list of authorized IP, which has been verified as part of the IP license certificate using the trusted public key, is compared with the list of loaded IP as found in authorized IP list 28. If any controlled IP has been loaded that is not in the authorized IP list 28, then the flow continues at reference numeral 160. If all of the verification steps have been successful, the IP is thus proven to be authorized and the individual integrated circuit is allowed to operate normally as shown at reference numeral 158, and the method then ends at reference numeral 162. If there was a failure at any of the verification steps, then some features of the design are disabled, as shown at reference numeral 160, and then the method ends at reference numeral 162. The penalty imposed at reference numeral 160 could effectively disrupt normal operation of the chip almost completely, for example by tri-stating all I/Os or stopping the clocks, or it could only disable features associated with the specific authorization failure, in analogy with the methods of FIG. 3 and FIG. 4, respectively.

The methods described with reference to FIGS. 2 through 6 may be implemented as a state machine, microcontroller, or microprocessor in the IP enforcer block 22 (FIG. 1) inside the individual integrated circuits. The IP enforcer block 22 may be a hardwired circuit block, or, in the case of a programmable integrated circuit, may be configured as a part of the programming process for the individual integrated circuit 10.

The methods of the present invention support various use and licensing models. For example, licenses could be restricted to a maximum number of devices, a particular user design/project, or time (e.g., the number of clock cycles since power was applied to the chip, or the cumulative number of clock cycles since the IP was first installed or run). Because each device is individually authorized, it is relatively easy to count the number of devices authorized to use the IP, as evidenced by having a digitally signed IP license certificate generated, and thus collect royalties. The IP enforcer block 22 can allow the IP to run for a limited time on a device in a "try before you buy" mode using features such as the one or more enable outputs (shown together in FIG. 1 at reference numeral 36). As an example of this feature of the present invention, the rightmost of the enable outputs 36 is coupled to a timer 38. The IP owner may establish which licensing modes are allowed for their IP in advance, or on a per-issuance basis. License conditions and modes may be included as metadata along with the IP (shown as items 26a, 26b, and 26c), or included with the data in the IP license certificate.

The present invention prevents overbuilding of integrated circuits with unauthorized copies of IP. In the field of user-programmable integrated circuits, the present invention prevents overbuilding of FPGAs, or other integrated circuits, with unauthorized copies of IP. More precisely, it effectively prevents the use of such unauthorized copies of any controlled IP by imposing penalties, making it infeasible to operate the chip in a way that takes advantage of the unauthorized IP in actual practice. It facilitates an IP marketplace because IP providers can be assured that their IP isn't used when unauthorized by them. These technical means of enforcement may provide better assurance than legal agreements/licenses do alone.

The invention can apply to any volatile or non-volatile FPGA or other user-programmable integrated circuit, but it is well suited for use with the SmartFusion®2 and IGLOO®2 family of devices manufactured and marketed by Microsemi SoC Corporation because they offer complimentary security services that make the implementation easier and more secure. The present invention provides much better security and allows binding of the license to individual devices, thus ensuring proper collection of royalties or adherence to other licensing restrictions.

The use in the present invention of an IP license certificate is particularly advantageous. The IP license certificate can be loaded at a later time than the user design; and the IP enforcer block 22 can be added to the user design to provide penalties if the IP license certificate is not valid for the included IP blocks.

Using well-known cryptographic techniques, the IP license certificate can be authenticated by the enforcer block using the public key associated with the private key that was used to digitally sign the IP license certificate. This verification process proves the integrity of the certified data, such as the list of authorized IP and the ID of the authorized device. It also proves the signer of the IP license certificate knew the associated private key: Presumably only legitimate authorized entities such as the HSM that generates the license certificates "know" the private key. The public key used to verify the signature is preferably inherently trusted by the enforcer block. In particular, the public key should be the public key of the legitimate IP vendor or his proxy (e.g., the authorized HSM), and not the public key of an adversary. Therefore, trusted processes are preferably used to store the public key in the non-volatile memory where it is kept, whether on-chip or off-chip, and precautions are preferably taken to make sure at all stages of transit, loading, and at rest that an adversary cannot substitute his own public key in place of the legitimate one, for if he does, then he can generate and sign his own IP license certificates that will appear authentic to the enforcer block when it attempts to verify them using the false but inherently trusted public key.

Likewise, the identification of the "loaded IP" is preferably a trusted process. As already mentioned, the loaded IP can be identified a number of ways, such as from a list provided by the design automation tool, metadata associated with each IP block, or a watermark that is tightly integrated as part of the IP, to name a few. The process of loading the list of loaded IP and of storing it "at rest" should be protected. In particular, it is important that the integrity and authenticity of the list be proven if there has been any potential exposure to tampering.

The integrated circuit may have several types of non-volatile storage memory, with different security characteristics, ease of use, and scarcity or cost. In some cases, it may be desirable to store the trusted public key and/or the list of loaded IP in one type of memory that may be less secure but less expensive in some way. Perhaps this memory is more easily overwritten, for example. Another use case may have different memories written at different times or by different actors. Another case is where the non-volatile memory used is off-chip. In cases such as these, the immutability of the public key or the list of loaded IP may not be as secure as needed. One solution to this is to compute a cryptographic message digest (known as a "hash") of the data whose integrity is paramount, and store the hash value in a more suitable, e.g., more secure, memory. Since the hash is a digest of all of the data, it does not consume as much memory as the source data. As an illustration, in flash FPGAs such as those produced by Microsemi SoC Corporation, the public key and the list of loaded IP could be stored in conventional eNVM that is potentially accessible by several on-chip resources. Then, the hash of this data can be stored in a more protected memory, such as in a portion of the FPGA fabric configuration memory that is designed to be accessible only to the IP enforcer block 22. The IP enforcer block 22 can verify the integrity of the public key and IP list before relying on them by re-computing the hash from the stored data, and confirming the value obtained matches the hash value which is stored in the more secure memory. Since the use of the hash value will expose any tampering, the security requirements for the source data are greatly relaxed.

The present invention integrates nicely with presently-used technology. In many prospective integrated circuits, no changes to the existing integrated circuit hardware design is required, with all of the enforcement, storage, and computational needs being done with existing hardware resources plus soft IP, such as FPGA soft logic or microcontroller firmware. The present invention is easy for both the user and IP vendor to use. The user just includes the controlled IP during the design creation flow of the electronic design automation (EDA) software such as Libero® available from Microsemi Corporation SoC Group, and the design automation does the rest. An IP Vendor simply issues "IP Tickets" authorizing a number of individual device licenses to be issued. Design automation software, such as Libero®, can easily include the enforcer block and associated eNVM data as part of the user bitstream when controlled third-party IP is selected for inclusion by the user.

As described above, an HSM, which is a specialized tamper-resistant and tamper-evident security device, can act as a trusted proxy for the third-party IP vendor(s) when duly authorized by the IP vendors (via an IP Ticket or Tickets, for example) to generate and sign an IP license certificate that authorizes selected IP for a particular individual device. This certificate is loaded into the eNVM of the device by the same or a different bitstream as the main part of the user design. At each boot-time, the IP enforcer block 22 validates that the third-party IP included in the design has been authorized, or it imposes a penalty such as disabling I/O, or stopping the clocks, without limitation.

At compile time, design automation software, such as Libero®, can automatically add IP enforcer block 22 to the device net-list whenever controlled third-party blocks are included by request of the user. In one embodiment, this includes a Rivest-Shamir-Adleman (RSA) public key from a project-specific HSM-generated RSA key pair, and eNVM data identifying all of the third-party IP block(s), i.e., the loaded IP list, placed in reserved write-protected eNVM pages. It also includes a standard enforcer FPGA fabric macro, and contains a hash of the project-specific eNVM data such as the list of loaded controlled IP and the public key. Typically, this results in a single bitstream that can be used in all of the devices in the project.

At programming time, the HSM queries the device serial number and may also obtain a device-specific response to a challenge given to the device's unique PUF. The user design including the IP enforcer block 22 (unless the IP enforcer block 22 is hardwired) is programmed into the device. The HSM generates an IP license certificate, which may include any, or all of, a list of authorized third-party IP identifiers, the individual chip serial number, the PUF challenge, and an RSA signature incorporating these data items. The RSA signature also preferably incorporates the device-unique PUF response to the challenge. The HSM controls the number of licenses issued by counting the number of device IP license certificates generated and signed, never exceeding the authority given it by the IP vendor(s), which may be communicated via the IP tickets or a consolidated job ticket as previously discussed. The individual integrated circuit IP license certificate is loaded into reserved eNVM pages in the device in another programming step. Persons of ordinary skill in the art will recognize that there are alternatives to RSA digital signatures for authenticating the license certificates. For instance, elliptic curve cryptography (ECC) digital signatures, or Diffie-Hellman (DH) or ECC-DH-based techniques can be used in place of RSA signatures. Even symmetric cryptographic schemes may be used, however, asymmetric schemes have a number of logistical and security advantages and are thus preferred.

At run time, the IP enforcer block 22 validates the hash of the RSA public key and list of included IP that is loaded in the eNVM. The IP enforcer block 22 queries the device serial number and also preferably obtains the device-specific response to the PUF challenge. The IP enforcer block 22 validates the serial number, the optional PUF response, the third-party IP IDs, and the RSA or other signature on the IP license certificate. If valid, the authorized IP is enabled, or else a penalty is applied (e.g., disable I/Os). Some discrete logic signals could also be encoded in the IP license certificate and, for example, only if the certificate is valid, output by the IP enforcer block 22 as shown collectively at reference numeral 38. These could be used to configure the third-party IP, enable features, serialize IP per device or per project, or for many other possible uses left to the imagination of the designer. These static logic signals inherit the nice security characteristic that they have been authorized by the signer of the IP license certificate, and the nice logistical characteristics that these bits can be determined late in the process without necessarily having to customize the controlled IP or metadata used in the earlier design preparation phase.

Persons of ordinary skill in the art will appreciate that the principles of the present invention are also applicable to hardwired (or programmable) integrated circuits that operate by running software or firmware programs. According to the present invention, it can be verified that software or firmware loaded into an individual integrated circuit is authorized to run on that individual integrated circuit. If the use of the software or firmware is authorized for the individual integrated circuit, an IP enforcer block 22 in the individual integrated circuit enables its use. If the use of the software or firmware is not authorized for the individual integrated circuit, an IP enforcer block 22 in the integrated circuit can disable some or all of the function of the integrated circuit. For example, the IP enforcer block 22 can disable the clock of a microprocessor or microcontroller so that it cannot run an unauthorized program. Likewise, it could enter an endless loop, preventing any other programs to run, or it could reset the chip, with the nature of the penalty being somewhat determined by the constraints of the devices and system, and otherwise limited only by the imagination of the designer.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for controlling the use of intellectual property (IP) in an individual integrated circuit in a group of N authorized integrated circuits, comprising:
   loading information into the individual integrated circuit, the information including a list identifying each item of the IP that has been loaded into the individual integrated circuit;
   creating by each owner of each item of IP authorized, license authorization information, the license authorization information including no identification information of individual integrated circuits for which the each item of IP is authorized;
   creating and certifying device license information by a trusted programmer from the license authorization information, the trusted programmer constrained to create the certified device license information for no more than N individual integrated circuits, the certified device license information created using an identification number of the individual integrated circuit and identifying individually each item of the IP authorized for the individual integrated circuit;
   loading the certified device license information into the individual integrated circuit from the trusted programmer;
   validating inside the individual integrated circuit authenticity and integrity of the certified device license information;
   comparing separately inside the individual integrated circuit each item of IP listed in the certified device license information to each item of IP on the identification list identifying the IP that has been loaded into the individual integrated circuit to determine whether each item of the loaded IP is authorized for the individual integrated circuit;
   enabling operation of the individual integrated circuit if the certified device license information is valid and if the loaded IP is authorized for use in the individual integrated circuit; and
   imposing a penalty on operation of the individual integrated circuit if the certified device license information is invalid or if the loaded IP is not authorized for use in the individual integrated circuit.

2. The method of claim 1 wherein the integrated circuit is a field programmable gate array (FPGA) and:
   loading information into the individual integrated circuit, the information including a list identifying the IP that has been loaded into the individual integrated circuit comprises loading the information into the individual FPGA, the information including a list identifying the IP that has been loaded into the individual FPGA;
   creating and certifying device license information by a trusted programmer from the license authorization information, the trusted programmer constrained to create the device license information for no more than N individual integrated circuits, the device license information created using an identification number of the individual integrated circuit and identifying the IP authorized for the individual integrated circuit comprises creating and certifying device license information by a trusted programmer from the license authorization information, the trusted programmer constrained to create and certify the device license information for no more than N individual FPGAs, the device license information created using an identification number of the individual FPGA and identifying the IP authorized for the individual FPGA;
   loading the certified device license information into the individual integrated circuit from the trusted programmer comprises loading the certified device license information into the individual FPGA;
   validating inside the individual integrated circuit authenticity and integrity of the certified device license information comprises validating inside the individual FPGA authenticity and integrity of the certified device license information;
   comparing separately inside the individual integrated circuit each item of IP listed in the certified device license information to each item of IP on the list identifying the IP that has been loaded into the individual integrated circuit to determine whether each item of the loaded IP is authorized for the individual integrated circuit comprises comparing inside the individual FPGA the certified device license information to the list identifying the IP that has been loaded into the individual FPGA to determine whether the loaded IP is authorized for the individual FPGA;

enabling operation of the individual integrated circuit if the certified device license information is valid and if the loaded IP is authorized for use in the individual integrated circuit comprises enabling operation of the individual FPGA if the certified device license information is valid and if the loaded IP is authorized for use in the individual FPGA; and imposing a penalty on operation of the individual integrated circuit if the certified device license information is invalid or if the loaded IP is not authorized for use in the individual integrated circuit comprises imposing a penalty on operation of the individual FPGA if the certified device license information is invalid or if the loaded IP is not authorized for use in the individual FPGA.

3. The method of claim 2 further comprising:
providing at least one level of optional functionality in the individual FPGA;
determining inside the individual FPGA whether the at least one level of functionality has been authorized for use in the individual FPGA; and
enabling the at least one level of optional functionality in the individual FPGA only if it has been determined inside the individual FPGA that the at least one level of functionality has been authorized for use in the individual FPGA.

4. The method of claim 3 wherein:
providing at least one level of optional functionality in the individual FPGA comprises providing selectable levels of functionality in the individual FPGA; and
determining inside the individual FPGA whether the at least one level of functionality has been authorized for the individual FPGA comprises determining which of the selectable levels of functionality in the individual FPGA have been authorized; and
enabling the at least one level of optional functionality in the individual FPGA comprises enabling the selectable levels of functionality in the individual FPGA that have been authorized.

5. The method of claim 4 wherein providing selectable levels of functionality in the individual FPGA comprises providing that the optional functionality does not operate, providing that the optional functionality does operate, and providing that the optional functionality operates for a limited period of time.

6. The method of claim 5 wherein providing that the optional functionality operates for a limited period of time comprises providing that the optional functionality operates for a limited period of time only if it is determined in the FPGA that the optional functionality operates for a limited period of time.

7. The method of claim 2 wherein imposing a penalty on operation of the individual FPGA if the certified device license information is invalid or if the at least one controlled IP circuit block is not authorized for use in the individual FPGA comprises disabling at least one clock circuit in the individual FPGA.

8. The method of claim 2 wherein imposing a penalty on operation of the individual FPGA if the certified device license information is invalid or if the at least one controlled IP circuit block is not authorized for use in the individual FPGA comprises disabling at least one input/output circuit in the individual FPGA.

9. The method of claim 2, wherein:
loading the device license information into the individual integrated circuit comprises loading an IP license certificate into the individual FPGA, the certificate including a list of controlled IP circuit blocks authorized for the individual FPGA; and
wherein determining inside the individual FPGA whether the at least one controlled IP circuit block is authorized for use in the individual FPGA comprises comparing the at least one controlled IP circuit block in the design file loaded into the individual FPGA with the list of controlled IP circuit blocks authorized for the individual FPGA contained in the IP license certificate.

10. The method of claim 1 wherein:
data including the IP comprises the IP and data including at least one of metadata associated with the IP and additional rule related data;
comparing separately inside the individual integrated circuit each item of IP listed in the device license information to each item of IP on the list identifying the IP that has been loaded into the individual integrated circuit to determine whether each item of the loaded IP is authorized for the individual integrated circuit comprises determining separately inside the individual integrated circuit whether each item of the loaded IP is included in the list identifying the IP that has been loaded into the individual integrated circuit and determining inside the individual integrated circuit whether all additional rules defined by the metadata associated with the IP together with any additional rule-related data have been met; and
imposing a penalty on operation of the individual integrated circuit if the certified device license information is invalid or if the loaded IP is not authorized for use in the individual integrated circuit comprises imposing a penalty on operation of the individual integrated circuit if the certified device license information is invalid or if any of the loaded IP is not identified by the information identifying the IP authorized for the individual integrated circuit or any of the rules specified by the metadata associated with the IP together with the additional rule-related data have not been met.

11. A method for controlling the use of intellectual property (IP) in an individual field programmable gate array (FPGA) in a group of N authorized FPGAs, comprising:
loading a design file into the individual FPGA, the design file including at least one controlled IP circuit block;
loading information into the individual FPGA, the information including a list identifying the at least one controlled IP circuit block that has been loaded into the individual FPGA;
creating by each owner of each controlled IP circuit block, license authorization information, the license authorization information including no identification information of individual integrated circuits for which the each controlled IP circuit block is authorized;
creating and certifying device license information by a trusted programmer from license authorization information received from each owner of each controlled IP circuit block, the trusted programmer constrained to create and certify the certified device license information for no more than N individual FPGAs, the device license information created by the trusted programmer using an identification number of the individual integrated circuit and identifying the IP authorized for the individual integrated circuit;
loading the certified device license information into the individual FPGA from a trusted programmer;

validating inside the individual integrated circuit authenticity and integrity of the certified device license information;

comparing separately inside the individual FPGA each individual IP circuit block listed in the device license information to each individual IP circuit block on the list identifying the at least one controlled IP circuit block that has been loaded into the individual FPGA to determine whether each of the at least one controlled IP circuit block is authorized for use in the individual FPGA;

enabling operation of the at least one controlled IP circuit block if the certified device license information is valid and if the at least one controlled IP circuit block is authorized for use in the individual FPGA; and imposing a penalty on operation of the individual FPGA if the certified device license information is invalid or if the at least one controlled IP circuit block is not authorized for use in the individual FPGA.

12. The method of claim 11, wherein:

loading the certified device license information into the individual FPGA comprises loading an IP license certificate into the individual FPGA, the certificate including a list of controlled IP circuit blocks authorized for the individual FPGA; and wherein comparing separately inside the individual FPGA each individual IP circuit block listed in the device license information to each individual IP circuit block on the list identifying the at least one controlled IP circuit block that has been loaded into the individual FPGA to determine whether each of the at least one controlled IP circuit block is authorized for use in the individual FPGA comprises comparing separately inside the individual FPGA each individual IP circuit block listed in the list of controlled IP circuit blocks authorized for the individual FPGA contained in the IP license certificate to each individual IP circuit block listed in the list identifying the at least one controlled IP circuit block that has been loaded into the individual FPGA to determine whether each of the at least one controlled IP circuit block is authorized for use in the individual FPGA.

* * * * *